April 19, 1949.　　　　F. W. AVILA　　　　2,467,721
AXLE SUSPENSION SYSTEM FOR VEHICLES
Filed Dec. 13, 1946
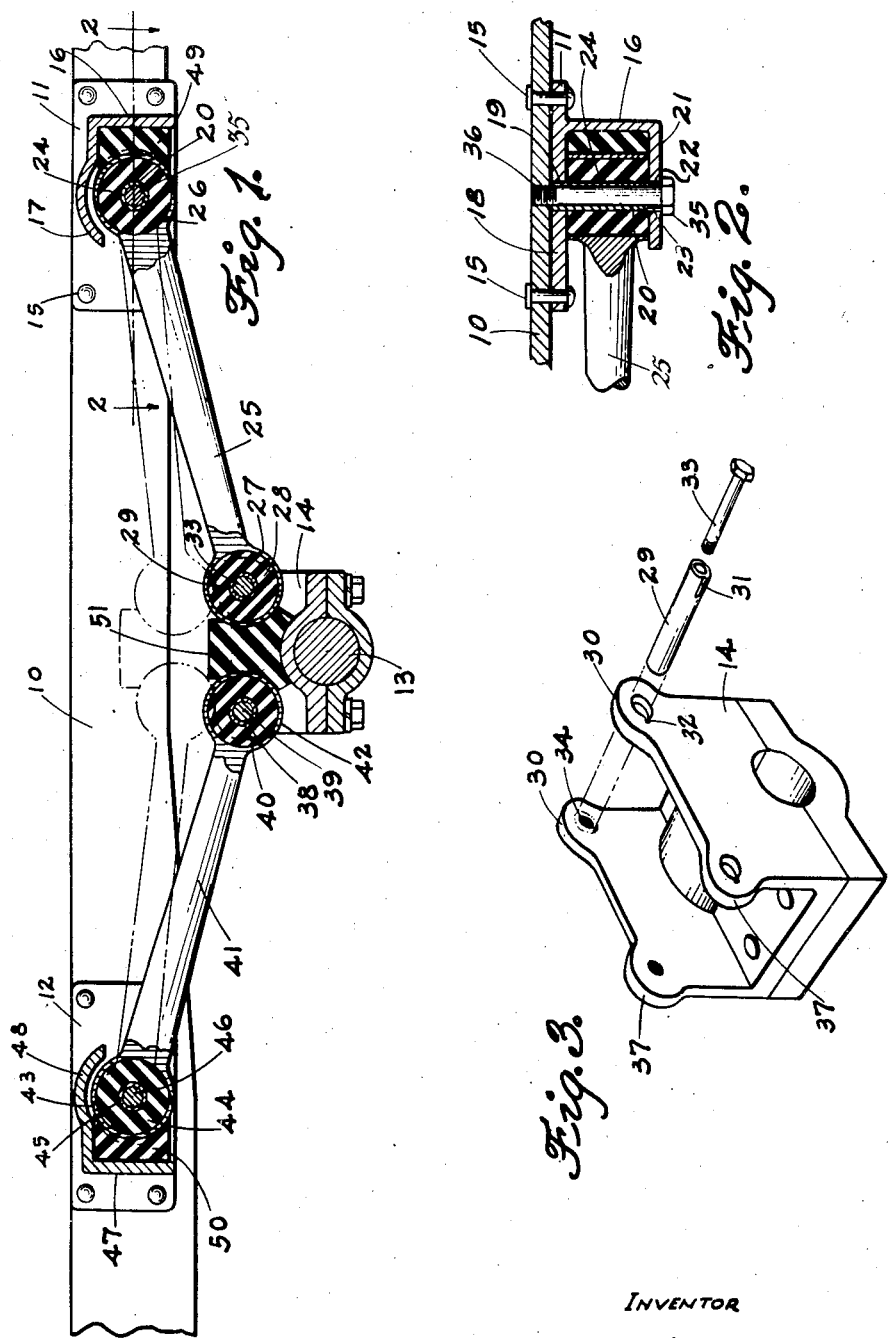
INVENTOR
Frank W. Avila
BY Paul O. Pippel
ATTORNEY Patented Apr. 19, 1949

2,467,721

UNITED STATES PATENT OFFICE 2,467,721

AXLE SUSPENSION SYSTEM FOR VEHICLES

Frank W. Avila, Columbia City, Ind., assignor to International Harvester Company, a corporation of New Jersey Application December 13, 1946, Serial No. 716,141

13 Claims. (Cl. 267—21)

1

This invention relates to an axle suspension for a vehicle, and more particularly to a suspension system of the type that employs control arms in conjunction with rubber or the like in place of conventional leaf or coil springs.

The invention contemplates and has for a principal object the provision of an improved suspension system embodying the use of rubber or the like in torsion in combination with rubber or the like in compression, to the end that a suspension system is simplified and rendered efficient in operation and inexpensive to manufacture.

Other objects of the invention are to provide a suspension system which employs a minimum of parts, which requires no lubrication and which adapts itself to vehicles of all types. A further understanding of the foregoing and other desirable objects and features of the invention may be had from the following detailed description taken in conjunction with the accompanying sheets of drawings in which:

Figure 1 is a side elevational view, partly in section, of one end portion of a vehicle equipped with a preferred form of suspension system;

Figure 2 is a horizontal sectional view of the mounting of one suspension arm on the vehicle frame, the view being taken substantially on the line 2—2 of Figure 1; and Figure 3 is an exploded perspective showing the axle bracket and the mounting pin and bolt.

Although the present disclosure is of a preferred embodiment of the suspension system as adapted to the springing of the front axle of the vehicle, it will be understood that the principles inherent therein are similarly applicable to the suspension of the vehicle rear axle. Likewise the present preferred embodiment is subject to various modifications, all of which may be made without departing from the scope of the invention.

For the purpose of illustration, the suspension system is shown as being mounted in conjunction with a vehicle frame having a longitudinal frame member 10 provided with a pair of longitudinally spaced brackets 11, at the front, and 12 at a point spaced rearwardly from the front of the vehicle. It will be understood that the vehicle frame includes a pair of parallel frame members 10 and that the components of the suspension system set forth below are duplicated at each side of the vehicle. Such suspension system functions also in conjunction with a transverse dead axle 13 which is provided with a pair of transversely spaced brackets 14, only one of which is shown.

The forward bracket 11 is rigidly secured to the frame member 10 as by a plurality of bolts or rivets 15 and includes a laterally outwardly extending flanged portion 16 having an upper arcuate portion 17. The bracket 11 further includes a vertical inner wall portion 18 which is apertured at 19 to receive a transverse hollow mounting pin 20. The outer portion of the bracket 11 includes a wall 21 paralleling the wall 18 and formed with an aperture 22 in alinement with the aperture 19. The hollow pin 20 is held against rotation with respect to the bracket 11 as by means of a key 23 cooperating between the pin 20 and the outer wall of the bracket 11 (Figure 2).

The mounting pin 20 carries and is encircled by a bushing 24 of flexible material such as rubber or the like. This bushing is bored to receive the pin 20 and the interior surface of the bore is bonded or otherwise rigidly secured to the exterior surface of the pin. The bushing 24 is confined in its lateral extent between the walls 18 and 21 of the bracket 11 and is spaced longitudinally from the transverse flange 16 of the bracket. A suspension arm or link 25 is provided at one end with an enlarged hollow connecting portion 26, the interior surface of which is cylindrical to receive and embrace the bushing 24. The outer surface of the bushing 24 is bonded or otherwise rigidly adhered to the inner cylindrical surface of the portion 26. The arrangement is such that the suspension arm 25 is mounted on the bracket 11 for resiliently-resisted vertical swinging movement about the axis of the mounting pin 20.

The other end of the suspension arm 25 is provided with an enlarged hollow portion 27 which is cylindrical and which carries a bushing 28 of conformation and composition similar to the bushing 24. The bushing 28 is associated with a transverse mounting pin 29 which is carried at opposite ends in a pair of transversely spaced upstanding ears 30 provided on the axle mounting bracket 14. The association between the pin 29 and bushing 28 corresponds to that between the pin 20 and the bushing 24 previously described. The pin 29 is provided with a keyway 31 which receives a key (not shown) for cooperation with a keyway 32 in the outer ear 30 of the bracket 14 (Figure 3) and the pin is held in place by means of a long bolt 33 which is threaded into a threaded aperture 34 in the inner ear 30 of the bracket 14. This mounting of the pin 29 corresponds generally with the mounting of the pin 20 in the bracket 11, the latter including a long bolt 35 which passes through the apertures 19 and 22 in the wall portions 18 and 21 of the bracket 11 and which is received by a threaded bore 36 in the frame member 10.

The relationship between the suspension arm or link 25 and the axle bracket 14, by means of the pin 29 and bushing 28, is such that the arm 25 is mounted on the bracket 14 for resiliently-resisted vertical swinging movement about the axis of the pin 29.

As shown in Figures 1 and 3, the axle bracket 14 includes a second pair of longitudinally spaced apertured ears 37 corresponding in construction and function to the ears 30. These ears serve, by means of a keyed pin 38, bolt 39 and bushing 40, of rubber or the like, to mount a second suspension arm or link 41, the one end of which is enlarged and hollow as at 42 to receive the bushing 40. The other end of the arm 41 is enlarged and hollow as at 43 to receive a bushing 44 of rubber or the like which in turn is mounted on a hollow pin 45 carried by a long bolt 46 associated with the bracket 12 in such a manner that the construction, function and purpose are the same as the corresponding characteristics of the mounting of the arm 25 on the bracket 11. The bracket 12 includes a transverse rear wall 47, spaced longitudinally from the end of the arm 41, and an upper arcuate wall portion 48 which corresponds to the wall portion 17 of the bracket 11.

The space between the forward end 26 of the arm 25 and the inner surface of the transverse wall 16 of the bracket 11 is filled with a block or pillow 49 of resilient material such as rubber or the like. A similar block or pillow 50 is assembled in the space between the rear end of the arm 41 and the transverse wall 47 of the bracket 12. The blocks 49 and 50 are preferably installed under compression.

A block or pillow 51, preferably composed of rubber in compression, is assembled in the axle bracket between the spaced ends 27 and 42 of the suspension arms 25 and 41 respectively. The rubber bushings 24, 28, 40 and 44 are preferably assembled in torsion.

In operation of the vehicle equipped with a suspension system constructed according to the principles of the invention as just set forth, the axle 13 has resiliently-resisted vertical oscillation with respect to the vehicle frame as the vehicle is loaded or as the wheels of the axle encounter uneven terrain. The probable maximum positions of the arms 25 are indicated in broken lines in Figure 1. Vertical movement of the axle 13 with respect to the frame 10 is resiliently resisted by the rubber bushings 24, 28, 40 and 44. As the axle 13 moves upwardly the distance from the center of the axle to each bracket tends to shorten. This result is accommodated by the flexibility of the bushings and the flexibility of the blocks 49, 50 and 51. Although the pins 20, 29, 38 and 45 cannot move with respect to the brackets 11, 14 and 12, eccentricity of the bushings 24, 28, 40 and 44 can occur. This results in displacement of the ends of the suspension arms 25 and 41 with respect to the brackets 11, 12 and 14. This displacement is resiliently resisted by the rubber blocks or pillows 49, 50 and 51. The flexibility of the system can be varied at the time of installation by means of variation in the torsion and compression under which the bushings and blocks are spaced.

It is not desired that the invention be limited to the exact details of construction shown and described, for obviously various modifications and alterations will occur to those skilled in the art.

What is claimed is:

1. A suspension system for a vehicle having a longitudinal frame member and a transverse axle, comprising: a pair of longitudinally spaced supports carried by the frame and arranged with the axle generally midway therebetween; a transverse mounting pin carried by each support; supporting bracket means connected to the axle; a pair of transverse mounting pins relatively closely spaced apart longitudinally on the axle support; a pair of arms arranged respectively between the mounting pins on the frame and the mounting pins on the axle support; means at each end of each arm forming a substantially cylindrical hollow bore, concentric with and surrounding the proximate pin; means including a plurality of bushings of rubber-like material, one being arranged within each bore of each arm and surrounding the proximate pin; means securing each bushing against rotation with respect to its associated pin and arm; means including a block of rubber-like material interposed between the adjacent ends of the arms at their points of connection with the axle, for resiliently resisting relative longitudinally movement between the axle and arms; and means including a pair of blocks of rubber-like material arranged respectively between the frame member and the other ends of the arms at their points of connection with the frame, for resiliently resisting relative longitudinal movement between the frame and the arms.

2. A suspension system as set forth in claim 1, further characterized in that: the bushings are pre-loaded in torsion.

3. A suspension system as set forth in claim 1, further characterized in that: the blocks are pre-loaded in compression.

4. A suspension system as set for in claim 1, further characterized in that: the bushings are pre-loaded in torsion and the blocks are pre-loaded in compresion.

5. A suspension system for a vehicle having a longitudinal frame member and a transverse axle, comprising: a pair of longitudinally spaced supports carried by the frame and arranged with the axle generally midway therebetween; supporting bracket means connected to the axle; a pair of arms, one extending generally longitudinally between each frame support and the axle support, each arm having one end in proximity to the axle support and its other end in proximity to a frame support; means including a bushing of rubber-like material connecting the axle end of each arm to the axle support for resiliently-resisted angular movement with respect to the axle about a generally transverse axis; means including a bushing of rubber-like material connecting the other end of each arm to its proximate support for resiliently-resisted angular movement with respect to the frame about a generally transverse axis; separate means, disposed exteriorly between each frame support and the proximate end of its associated arm, including a block of rubber-like material arranged to resiliently resist relative longitudinal movement between the arms and the frame; and means, disposed between and in abutting relation with the proximate portions of the axle ends of the arms, including a block of rubber-like material arranged to resiliently resist relative longitudinal movement between the axle and the arms.

6. A suspension system for a vehicle having a longitudinal frame member and a transverse axle, comprising: a pair of longitudinally spaced supports carried by the frame and arranged with the axle generally midway therebetween; supporting bracket means connected to the axle; a pair of arms, one extending generally longitudinally between each frame support and the axle support, each arm having one end in proximity to the axle support and its other end in proximity to a frame support; bushing means connecting the axle end of each arm to the axle support for angular movement with respect to the axle about a generally transverse axis; means including a bushing of rubber-like material connecting the other end of each arm to its proximate support for resiliently-resisted angular movement with respect to the frame about a generally transverse axis; separate means, disposed exteriorly between each frame support and the proximate end of its associated arm, including a block of rubber-like material arranged to resiliently resist relative longitudinal movement between the arms and the frame; and means, disposed between and in abutting relation with the proximate portions of the axle ends of the arms, including a block of rubber-like material arranged to resiliently resist relative longitudinal movement between the axle and the arms.

7. A suspension system for a vehicle having a longitudinal frame member and a transverse axle, comprising: a pair of longitudinally spaced supports carried by the frame and arranged with the axle generally midway therebetween; supporting bracket means connected to the axle; a pair of arms, one extending generally longitudinally between each frame support and the axle support, each arm having one end in proximity to the axle support and its other end in proximity to a frame support; means including a bushing of rubber-like material connecting the axle end of each arm to the axle support for resiliently-resisted angular movement with respect to the axle about a generally transverse axis; bushing means connecting the other end of each arm to its proximate support for angular movement with respect to the frame about a generally transverse axis; separate means, disposed exteriorly between each frame support and the proximate end of its associated arm, including a block of rubber-like material arranged to resiliently resist relative longitudinal movement between the arms and the frame; and means, disposed between and in abutting relation with the proximate portions of the axle ends of the arms, including a block of rubber-like material arranged to resiliently resist relative longitudinal movement between the axle and the arms.

8. A suspension system for a vehicle having a longitudinal frame member and a transverse axle, comprising: a pair of longitudinally spaced supports carried by the frame and arranged with the axle generally midway therebetween; supporting bracket means connected to the axle; a pair of arms, one extending generally longitudinally between each frame support and the axle support, each arm having one end in proximity to the axle support and its other end in proximity to a frame support; means including a bushing of rubber-like material connecting the axle end of each arm to the axle support for resiliently-resisted angular movement with respect to the axle about a generally transverse axis; means including a bushing of rubber-like material connecting the other end of each arm to its proximate support for resiliently-resisted angular movement with respect to the frame about a generally transverse axis; and separate means, disposed exteriorly between each frame support and the proximate end of its associated arm, including a block of rubber-like material arranged to resiliently resist relative longitudinal movement between the arms and the frame.

9. A suspension system for a vehicle having a longitudinal frame member and a transverse axle, comprising: a pair of longitudinally spaced supports carried by the frame and arranged with the axle generally midway therebetween; supporting bracket means connected to the axle; a pair of arms, one extending generally longitudinally between each frame support and the axle support, each arm having one end in proximity to the axle support and its other end in proximity to a frame support; bushing means connecting the axle end of each arm to the axle support for angular movement with respect to the axle about a generally transverse axis; means including a bushing of rubber-like material connecting the other end of each arm to its proximate support for resiliently-resisted angular movement with respect to the frame about a generally transverse axis; and separate means, disposed exteriorly between each frame support and the proximate end of its associated arm, including a block of rubber-like material arranged to resiliently resist relative longitudinal movement between the arms and the frame.

10. A suspension system for a vehicle having a longitudinal frame member and a transverse axle, comprising: a pair of longitudinally spaced supports carried by the frame and arranged with the axle generally midway therebetween; supporting bracket means connected to the axle; a pair of arms, one extending generally longitudinally between each frame support and the axle support, each arm having one end in proximity to the axle support and its other end in proximity to a frame support; means including a bushing of rubber-like material connecting the axle end of each arm to the axle support for resiliently resisted angular movement with respect to the axle about a generally transverse axis; bushing means connecting the other end of each arm to its proximate support for angular movement with respect to the frame about a generally transverse axis; and separate means, disposed exteriorly between each frame support and the proximate end of its associated arm, including a block of rubber-like material arranged to resiliently resist relative longitudinal movement between the arms and the frame.

11. A suspension system for a vehicle having a longitudinal frame member and a transverse axle, comprising: a pair of longitudinally spaced supports carried by the frame and arranged with the axle generally midway therebetween; supporting bracket means connected to the axle; a pair of arms, one extending generally longitudinally between each frame support and the axle support, each arm having one end in proximity to the axle support and its other end in proximity to a frame support; bushing means connecting the axle end of each arm to the axle support for angular movement with respect to the axle about a generally transverse axis; means including a bushing of rubber-like material connecting the other end of each arm to its proximate support for resiliently-resisted angular movement with respect to the frame about a generally transverse axis; and means, disposed between and in abutting relation with the proximate portions of the axle ends of the arms, including a block of rubber-like material arranged to resiliently resist relative longitudinal movement between the axle and the arms.

12. A suspension system for a vehicle having a longitudinal frame member and a transverse axle, comprising: a pair of longitudinally spaced supports carried by the frame and arranged with the axle generally midway therebetween; supporting bracket means connected to the axle; a pair of arms, one extending generally longitudinally between each frame support and the axle support, each arm having one end in proximity to the axle support and its other end in proximity to a frame support; means including a bushing of rubber-like material connecting the axle end of each arm to the axle support for resiliently-resisted angular movement with respect to the axle about a generally transverse axis; means including a bushing of rubber-like material connecting the other end of each arm to its proximate support for resiliently-resisted angular movement with respect to the frame about a generally transverse axis; separate means, disposed exteriorly between each frame support and the proximate end of its associated arm, including a block of rubber-like material arranged to resiliently resist relative longitudinal movement between the arms and the frame; and means, disposed in said support bracket and in abutting relation with the proximate portions of the axle ends of the arms, including a block of rubber-like material arranged to resiliently resist relative longitudinal movement between the axle and the arms.

13. A suspension system for a vehicle having a longitudinal frame member and a transverse axle, comprising: a pair of longitudinally spaced supports carried by the frame and arranged with the axle generally midway therebetween; a transverse mounting pin carried by each support; supporting bracket means connected to the axle; a pair of transverse mounting pins relatively closely spaced apart longitudinally on the axle support; a pair of arms arranged respectively between the mounting pins on the frame and the mounting pins on the axle support; means at each end of each arm forming a substantially cylindrical hollow bore, concentric with and surrounding the proximate pin; means including a plurality of bushings of rubber-like material, one being arranged within each bore of each arm and surrounding the proximate pin; means securing each bushing against rotation with respect to its associated pin and arm; separate means, including a block of rubber-like material interposed exteriorly between one end of each arm and its proximate frame support and arranged to resiliently resist relative longitudinal movement between the arms and the frame; and means, disposed in said support bracket in abutting relation with the proximate portions of the axle ends of the arms, including a block of rubber-like material arranged to resiliently resist relative longitudinal movement between the axle and the arms.

FRANK W. AVILA.

REFERENCES CITED

The following references are of record in the file of this patent:

UNITED STATES PATENTS

| Number | Name | Date |
| --- | --- | --- |
| 808,251 | VonNolle | Dec. 26, 1905 |
| 1,452,693 | Lord | Apr. 24, 1923 |
| 1,514,796 | Seymour | Nov. 11, 1924 |
| 1,934,892 | Tea | Nov. 14, 1932 |
| 2,061,651 | Clauson | Nov. 24, 1936 |
| 2,305,795 | Schieferstein | Dec. 22, 1942 |

FOREIGN PATENTS

| Number | Country | Date |
| --- | --- | --- |
| 363,039 | Great Britain | Dec. 17, 1931 |